US010046523B2

(12) United States Patent
Sung et al.

(10) Patent No.: US 10,046,523 B2
(45) Date of Patent: Aug. 14, 2018

(54) DELTA 3D PRINTER AND CALIBRATING METHOD FOR USING THE SAME

(71) Applicants: XYZPRINTING, INC., New Taipei (TW); KINPO ELECTRONICS, INC., New Taipei (TW)

(72) Inventors: Hung-Huan Sung, New Taipei (TW); Shih-His Chiang, New Taipei (TW); Tzu-Cheng Chang, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 402 days.

(21) Appl. No.: 15/064,592

(22) Filed: Mar. 8, 2016

(65) Prior Publication Data
US 2017/0144379 A1    May 25, 2017

(30) Foreign Application Priority Data
Nov. 20, 2015 (CN) .......................... 2015 1 0808293

(51) Int. Cl.
*B29C 64/20* (2017.01)
*B29C 67/00* (2017.01)
*B33Y 50/02* (2015.01)

(52) U.S. Cl.
CPC ...... *B29C 67/0088* (2013.01); *B29C 67/0092* (2013.01); *B33Y 50/02* (2014.12)

(58) Field of Classification Search
None
See application file for complete search history.

(56) References Cited

U.S. PATENT DOCUMENTS

| 2015/0147424 A1* | 5/2015 | Bibas | B29C 67/0088 425/150 |
| 2015/0273768 A1* | 10/2015 | Wyatt | B29C 67/0088 700/119 |
| 2016/0167309 A1* | 6/2016 | Liu | B29C 67/0055 264/40.1 |
| 2016/0202691 A1* | 7/2016 | Pettersson | G05B 19/4184 700/98 |

FOREIGN PATENT DOCUMENTS

KR        20150049091 A  *  5/2015  ............. B29C 67/00

* cited by examiner

*Primary Examiner* — Jacob T Minskey
*Assistant Examiner* — Cedrick S Williams
(74) *Attorney, Agent, or Firm* — Chun-Ming Shih; HDLS IPR Services

(57) ABSTRACT

A calibration method of a delta 3D printer, wherein a vertical calibration mechanism is disposed on a vertical direction, a horizontal calibration mechanism is disposed on the horizontal direction and a printing-platform calibration mechanism is disposed under the printing-platform of the 3D printer. Before performing a new printing task, the 3D printer first controls three sliding components to move vertically and performs a calibration on the Z-Axis via the vertical calibration mechanism. Next, controls the nozzle to move horizontally and performs a calibration on X-Axis and the Y-Axis via the horizontal calibration mechanism. After the X-Axis, Y-Axis and Z-Axis are all calibrated, the 3D printer performs a tilt degree calibration on the printing-platform via the printing-platform calibration mechanism. Lastly, after performing all calibration operations, the 3D printer starts to execute the new printing task.

20 Claims, 13 Drawing Sheets

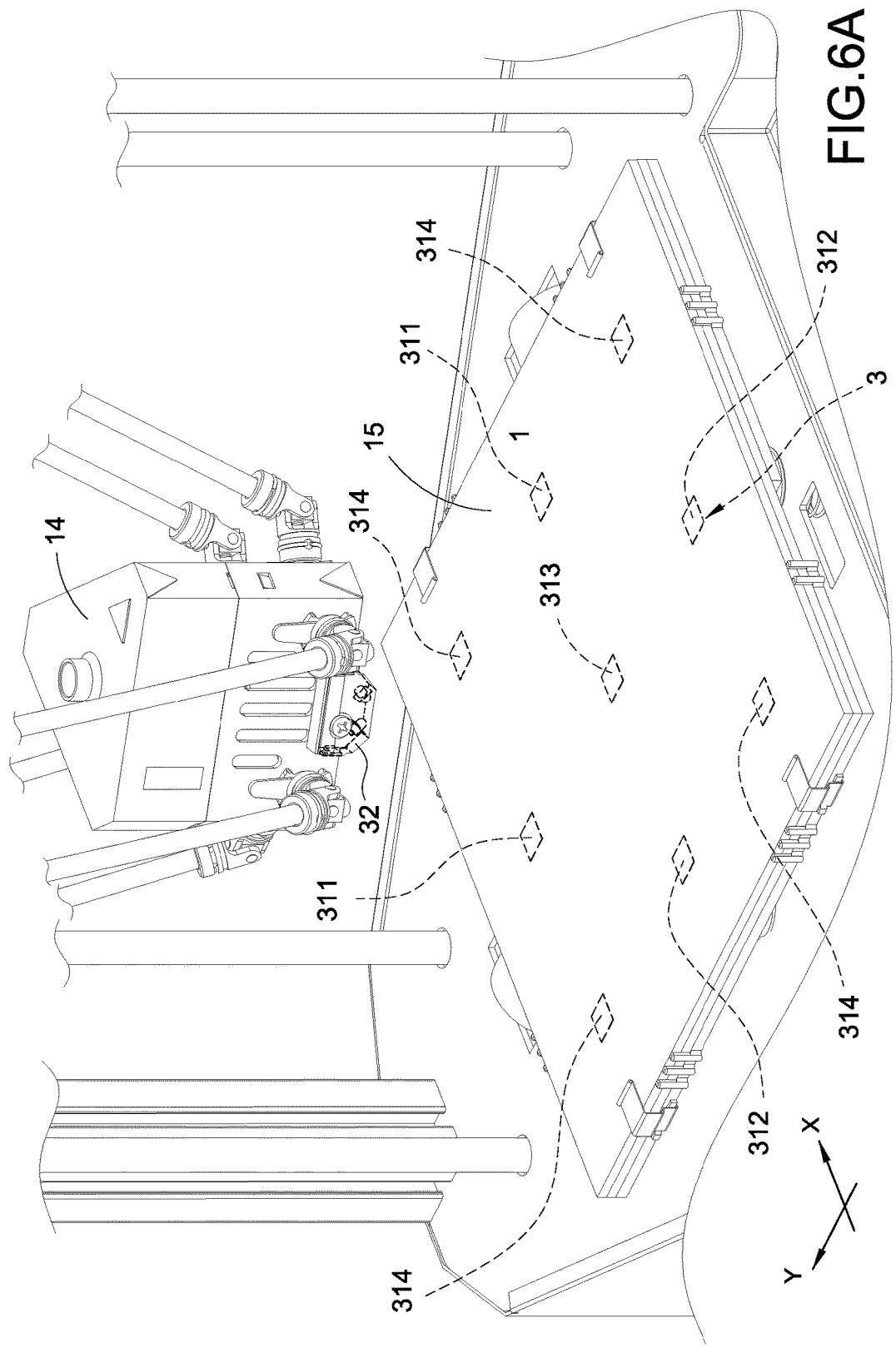

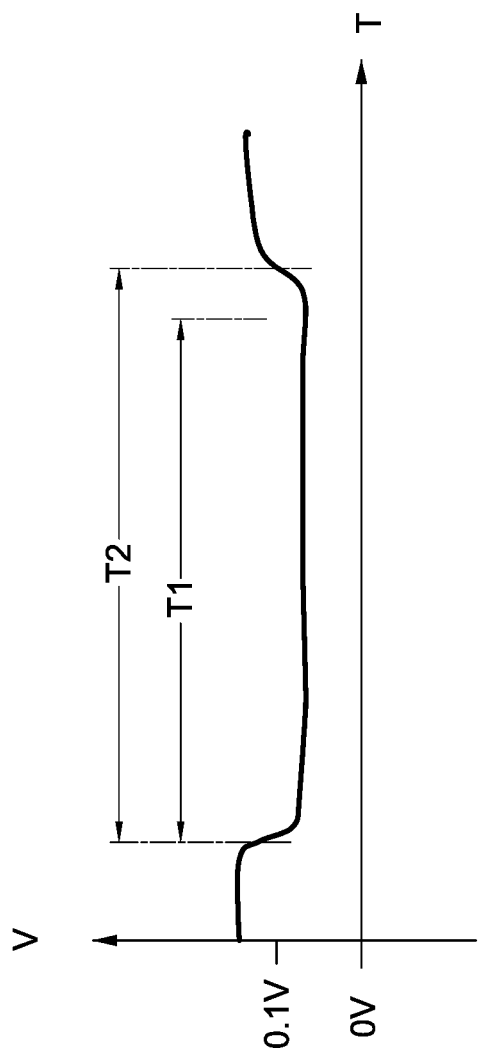

US 10,046,523 B2

DELTA 3D PRINTER AND CALIBRATING METHOD FOR USING THE SAME

BACKGROUND OF THE INVENTION

Field of the Invention

The present invention relates to a 3D printer and calibration method for using the same, in particular relates to a delta 3D printer and a calibration method for using the same.

Description of Prior Art

In recent years, 3D printing technology advances rapidly, the 3D printing applications has become more and more popular as the 3D printer pricing reduces.

Inspired by different design concept, there are many different models of 3D printers available in the market; the most recognized model is the delta 3D printer with the most stable and fast nozzle movement.

FIG. 1 is a delta 3D printer schematic diagram of prior arts. The delta 3D printer (referred as 3D printer 1 in the following) is triangle shaped, where a support rod 11 is respectively disposed on three corners.

A sliding component 12 which moves vertically is respectively disposed on each support rod 11. The sliding component 12 is pivotally connected with a nozzle 14 via two arms 13, and the sliding component 12, the two arms 13 and the nozzle 14 form a parallelogram with fixed area.

As shown in FIG. 1, the 3D printer 1 horizontally moves the nozzle 14 to any required height and location via the above mentioned three sliding components 12 and three sets of arms 13, where the 3D printer 1 prints out the physical 3D models according to input 3D file.

However, when prints a 3D model, each sliding components 12 and each set of arms 13 have to move frequently. Typically, after performing a number of printing tasks, the actual displacement amount of each sliding components 12 may deviate from the predetermined displacement amount of the 3D printer 1. For example, the predetermined displacement amount of each sliding components 12 by moving one unit (once) is 0.1 cm in length. However, the distance of each sliding components 12 moving one unit (i.e. the actual displacement amount) may become 0.3 cm after performing many printing operations.

Further, when printing out the 3D model, the nozzle 14 may contact a printing-platform 15 on the 3D printer 1, or the formed 3D model on the printing-platform 15. Accordingly after the 3D printer prints for a long period of time, the printing-platform 15 may tilt. Once the displacement amounts of each sliding components 12 or the nozzle 14 deviate, or the printing-platform 15 tilts, the 3D model may be deformed, or even the printing task may fail.

SUMMARY OF THE INVENTION

The disclosure is directed to a delta 3D printer and calibrating method for using the same, where the delta 3D printer first performs calibrations on X-Axis, Y-Axis, Z-Axis and printing-platform then starts new printing tasks.

In one of the exemplary embodiments, a vertical calibration mechanism is disposed on a vertical direction, a horizontal calibration mechanism is disposed on the horizontal direction and a printing-platform calibration mechanism is disposed under the printing-platform of the delta 3D printer. Before performing a new printing task, the 3D printer first controls three sliding components to move vertically and performs a calibration on the Z-Axis via the vertical calibration mechanism. Next, controls the nozzle to move horizontally and performs a calibration on X-Axis and the Y-Axis via the horizontal calibration mechanism. After the X-Axis, Y-Axis and Z-Axis are all calibrated, performs a tilt degree calibration on the printing-platform via the printing-platform calibration mechanism. Lastly, after performing all calibration operations, the 3D printer starts to execute new printing tasks.

Compare to prior arts, the technical advantage provided by the present disclosure is that the X-Axis, Y-Axis, Z-Axis and printing-platform calibrations are respectively performed via a plurality of calibration mechanisms before the delta 3D printer performs new printing tasks. Thus, the issue is prevented where the actual displacement amount and the predetermined displacement amount of each sliding components and nozzle may deviate, or the printing-platform may tilt after the 3D printer performs multiple printing tasks. Thus, the compromised quality of printed 3D models or the 3D printer print failure caused by the above mentioned displacement amount errors or tilt issues are avoided.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 6A is a horizontal calibration mechanism schematic diagram of the first embodiment according to the present disclosure;

FIG. 6C is a voltage variation schematic diagram of the first embodiment according to the present disclosure;

DETAILED DESCRIPTION OF THE INVENTION

Figure 2:
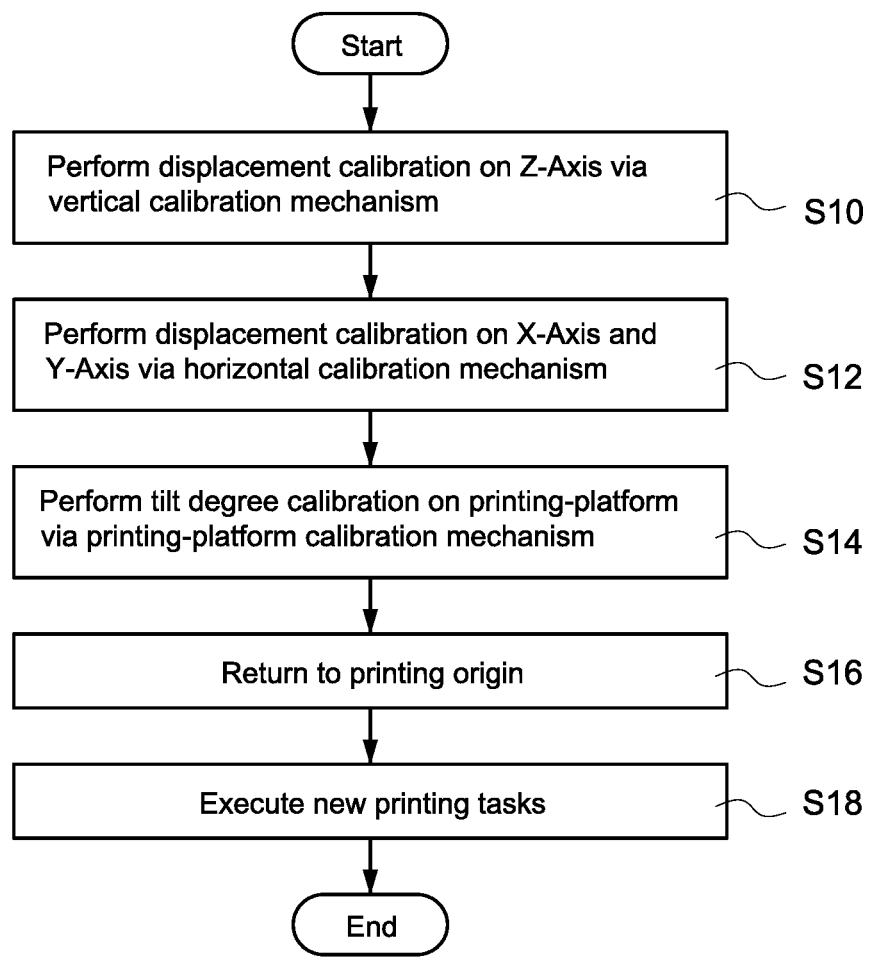
FIG. 2 is a calibration flowchart of the first embodiment according to the present disclosure.
Figure 3:
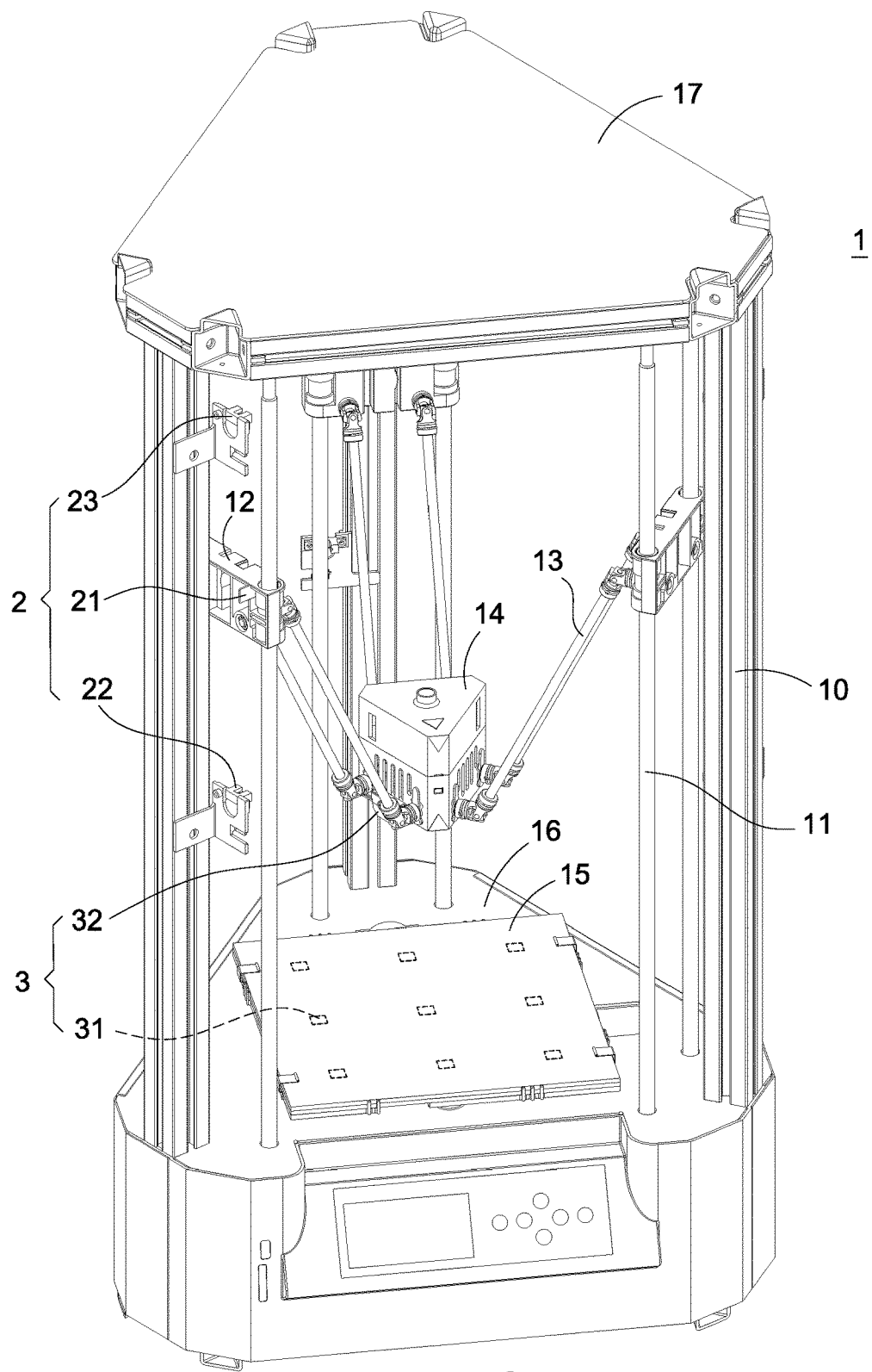
FIG. 3 is a delta 3D printer schematic diagram of the first embodiment according to the present disclosure.

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

FIG. 2 is a calibration flowchart of the first embodiment according to the present disclosure and FIG. 3 is a delta 3D printer schematic diagram of the first embodiment according to the present disclosure. An improved delta 3D printer 1 (referred as the 3D printer 1 in the following) is disclosed in the embodiment, and the calibration method used by the 3D printer 1.

Figure 1:
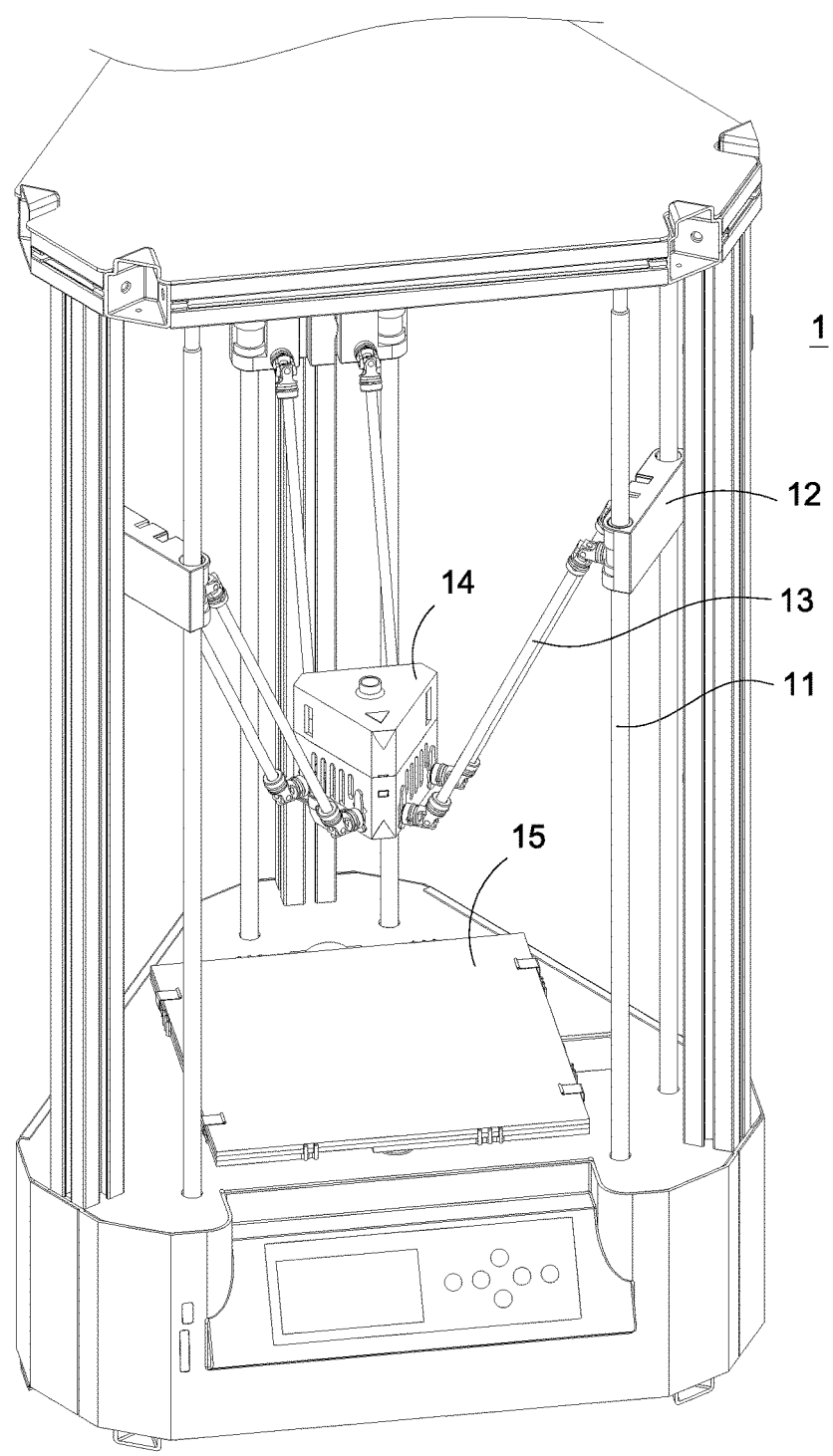
FIG. 1 is a delta 3D printer schematic diagram of prior arts.

It should be noted that the 3D printer 1 according to the present disclosure is improved on the basis of the 3D printer 1 shown in FIG. 1, where a vertical calibration mechanism 2, a horizontal calibration mechanism 3 and a printing-platform calibration mechanism 4 are added, and the 3D printer 1 performs the displacement calibrations and the tilt degree calibration via the calibration mechanisms 2-4.

As shown in FIG. 3, the 3D printer 1 according to the present disclosure is identical with the 3D printer 1 disclosed in FIG. 1. The 3D printer 1 has a base 16 and a cap 17, a printing-platform 15 disposed on the base 16, three support brackets 10 vertically disposed on three corners of the base 16, and three support rods 11 also vertically disposed on the above mentioned three corners, three sliding components 11 removably and respectively disposed on each support rod 11, a nozzle 14 to move horizontally, and a plurality of arms 13 respectively and pivotally connected with the nozzle 14 and each sliding component 11.

The basic structure of the above mentioned 3D printer 1 is well known by the people who skilled in the art, and is not elaborated hereto. The present disclosure is characterized in that the vertical calibration mechanism 2, the horizontal calibration mechanism 3 and the printing-platform calibration mechanism 4 mentioned above are disposed on the 3D printer 1.

As shown in FIG. 2, before the 3D printer 1 performs a new printing task, the 3D printer 1 performs a displacement calibration on each sliding component 1 of a Z-Axis (i.e. up and down vertically) via the vertical calibration mechanism 2 (step S10). Next, after the displacement calibration on the Z-Axis is completed, the 3D printer 1 performs the displacement calibration on the nozzle 14 of an X-Axis (i.e. left and right direction horizontally) and a Y-Axis (i.e. front and rear direction horizontally) via the horizontal calibration mechanism 3 (step S12).

When the X-Axis, the Y-Axis and the Z-Axis are all calibrated, the 3D printer 1 further performs a tilt degree calibration on the printing-platform 15 via the printing-platform calibration mechanism 4 (step S14). After the angle calibration of the printing-platform 15 is also completed, the 3D printer 1 controls the nozzle 14 to return to a printing origin (step S16), and executes new printing tasks according to calibrated data.

The technical advantage provided by the present disclosure is that, the 3D printer 1 performs calibrations on the X-Axis, the Y-Axis, the Z-Axis and the tilt degree of the printing-platform 15 before executing new printing tasks, or after executing printing tasks for a certain number of times so as to ensure the parameters applied in each printing task is the same.

As shown in FIG. 3, in the embodiment, the vertical calibration mechanism 2 comprises shielding structures 21 separately disposed on each sliding component 12, and a plurality of light blocking sensors 22, 23 disposed on any support bracket 10. The horizontal calibration mechanism 3 comprises a plurality of localization color blocks 31 disposed on the printing-platform 15, and a reflected light quantity sensor 32 disposed on the nozzle 14. The printing-platform calibration mechanism 4 comprises an elastic component and an off-center wheel disposed under the printing-platform 15 and supports the printing-platform 15, and an electromagnetic valve connecting to the off-center wheel and controlling rotation of the off-center wheel (as the elastic component 41, the off-center wheel 42 and the electromagnetic valve 43 shown in FIG. 8A).

Figure 4:
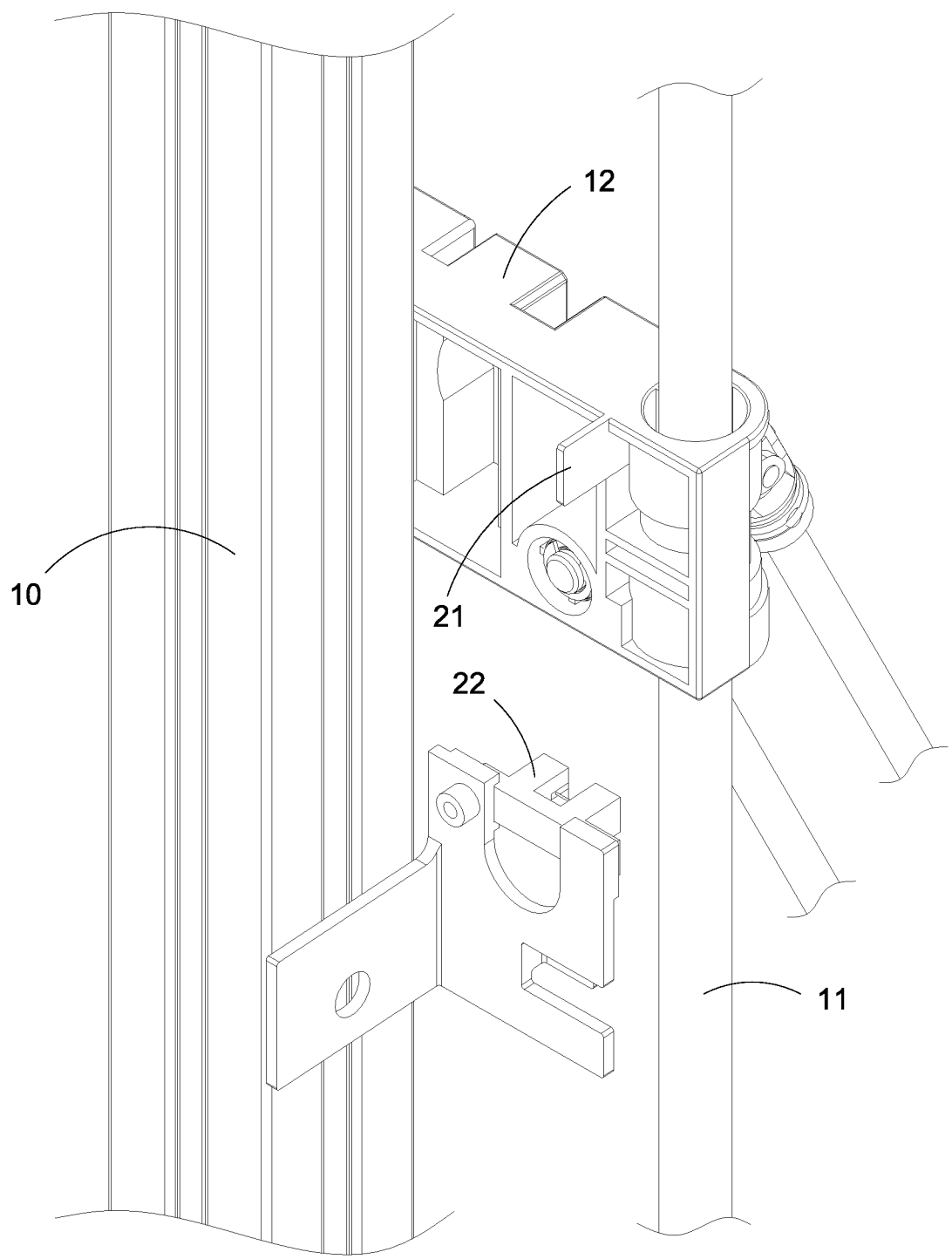
FIG. 4 is a vertical calibration mechanism schematic diagram of the first embodiment according to the present disclosure.
Figure 5:
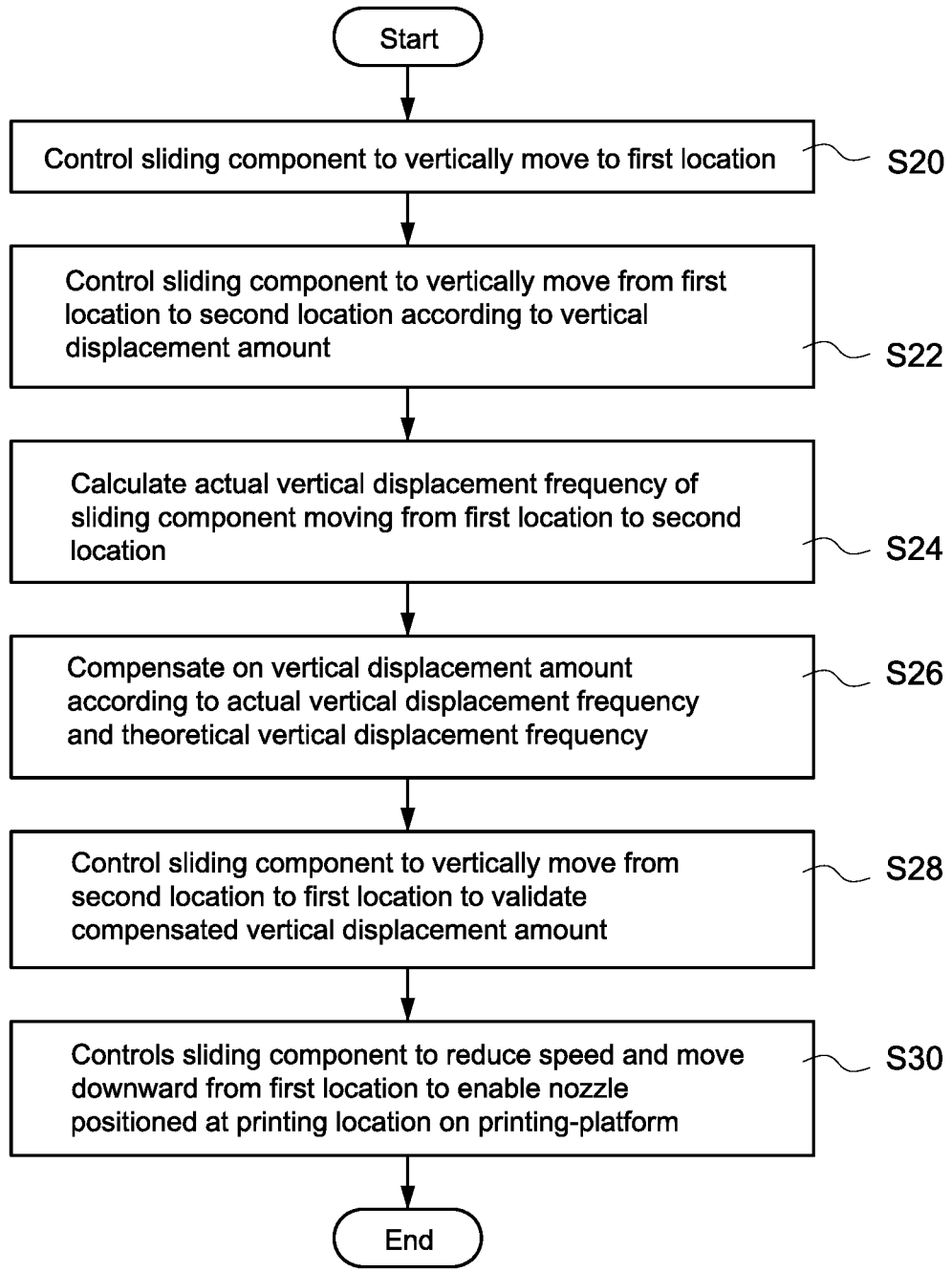
FIG. 5 is a Z-Axis calibration flowchart of the first embodiment according to the present disclosure.

FIG. 4 is a vertical calibration mechanism schematic diagram of the first embodiment according to the present disclosure and FIG. 5 is a Z-Axis calibration flowchart of the first embodiment according to the present disclosure. In the embodiment, the vertical calibration mechanism 2 comprises a first light blocking sensor 22 and a second light blocking sensor 23, the first light blocking sensor 22 is disposed on a first location on one of the three support brackets 10, and the second light blocking sensor 23 is disposed on a second location on the same support bracket 10.

In the embodiment, the first location is positioned under the second location. Preferably, the first location is positioned on a lower limit point on the support bracket 10, the second location is positioned the on an upper limit point on the support bracket 10. Optimally, the first location is positioned at a location near the lower limit point, but the scope is not limited thereto.

The plurality of light blocking sensors 22, 23 emit light and are triggered when the emitted light source is blocked. In the embodiment, the shielding structure 21 is disposed correspondingly to the location of the plurality of light blocking sensors 22, 23. Specifically, when the sliding component 12 disposed with the shielding structure 21 vertically move to the first location, the shielding structure 21 precisely blocks the light emitting source of the first light blocking sensor 22 in order to trigger the first light blocking sensor 22. When the sliding component 12 vertically moves to the second location, the shielding structure 21 precisely blocks the light emitting source of the second light blocking sensor 23 in order to trigger the second light blocking sensor 23. The 3D printer 1 determines the current location of the sliding component 12 according to the trigger status of the two light blocking sensors 22, 23.

In FIG. 5, the procedures of the 3D printer 1 performs the Z-Axis calibration via the vertical calibration mechanism 2 is illustrated. Firstly, before the 3D printer 1 starts to execute a new printing task, the 3D printer 1 first controls the sliding component 12 to vertically move to the first location, which the shielding structure 21 can block the light emitting source of the first light blocking sensor 22 (step S20). Next, controls the sliding component 12, according to a vertical displacement amount, to vertically move from the first location to the second location, which the shielding structure 21 can block the light emitting source of the second light blocking sensor 23 (step S22).

It should be noted that, the vertical displacement amount is the distance of the sliding component 12 moving once (or one unit) upon the control by the 3D printer 1. In the embodiment, the 3D printer 1 is predetermined that the required movement frequency of the sliding component 12 moving from the first location vertically to the second location according to the vertical displacement amount is a theoretical vertical displacement frequency.

After the step S22, the 3D printer 1 calculates to generate an actual vertical displacement frequency of the sliding component 12 moving from the first location to the second location (step S24). The 3D printer 1 performs compensation on the vertical displacement amount according to the actual vertical displacement frequency and the theoretical vertical displacement frequency (step S26). In the embodiment, the 3D printer 1 applies the compensated vertical displacement amount to execute the above mentioned new printing tasks.

For example, if the theoretical vertical displacement frequency is 100 times, when the sliding component 12 starts to move from the first location and moves 100 times according to the vertical displacement amount (for example 0.2 cm), the sliding component 12 accordingly should move to the second location.

However, if the sliding component 12 moves 100 times, and the second light blocking sensor 23 is not triggered yet (i.e. the sliding component 12 has not arrived on the second location), then the vertical displacement amount deviates. At this point, the 3D printer 1 controls the sliding component 12 to continue to move until the second light blocking sensor 23 is triggered. The 3D printer 1 applies the actual move frequency of the sliding component 12 as the actual vertical displacement frequency (for example 101 times). In the embodiment, when the vertical displacement amount deviates, the 3D printer 1 performs compensation on the vertical displacement amount according to the following Formula One:

$$\text{The vertical displacement amount} + \left( \frac{\text{actual vertical displacement frequency} - \text{theoretical vertical diplacement frequency}}{\text{theoretical vertical displacement frequency}} \right) = \text{the vertical displacement amount after compensation} \quad \text{Formula One}$$

With the above mentioned Formula One, the 3D printer 1 is allowed to assure that the vertical displacement amount applied each time executing printing tasks is the same, and when the 3D printer 1 controls the sliding component 12 to move vertically according to the vertical displacement amount, the actual vertical displacement frequency equals to the predetermined theoretical vertical displacement frequency.

After the step S26, the 3D printer 1 controls the sliding component 12 to vertically move from the second location to the first location according to the compensated vertical displacement amount in order to validate if the actual vertical displacement frequency equals to the theoretical vertical displacement frequency when the 3D printer 1 controls the sliding component 12 to vertically move according to the compensated vertical displacement amount (step S28). If the actual vertical displacement frequency is different from the theoretical vertical displacement frequency, which means that the calibration fails. As a result, the 3D printer 1 re-performs the displacement calibration on the Z-Axis of the sliding component 12.

After the step S28, the 3D printer 1 controls the sliding component 12 to reduce the speed, and slowly move downward from the first location in order to enable the nozzle 14 connecting to the sliding component 12 to be positioned at a printing location on the printing-platform 15 (step S30). After the step S30 is completed, the 3D printer 1 performs the displacement calibration on the X-Axis and the Y-Axis of the nozzle 14.

Figure 6B:
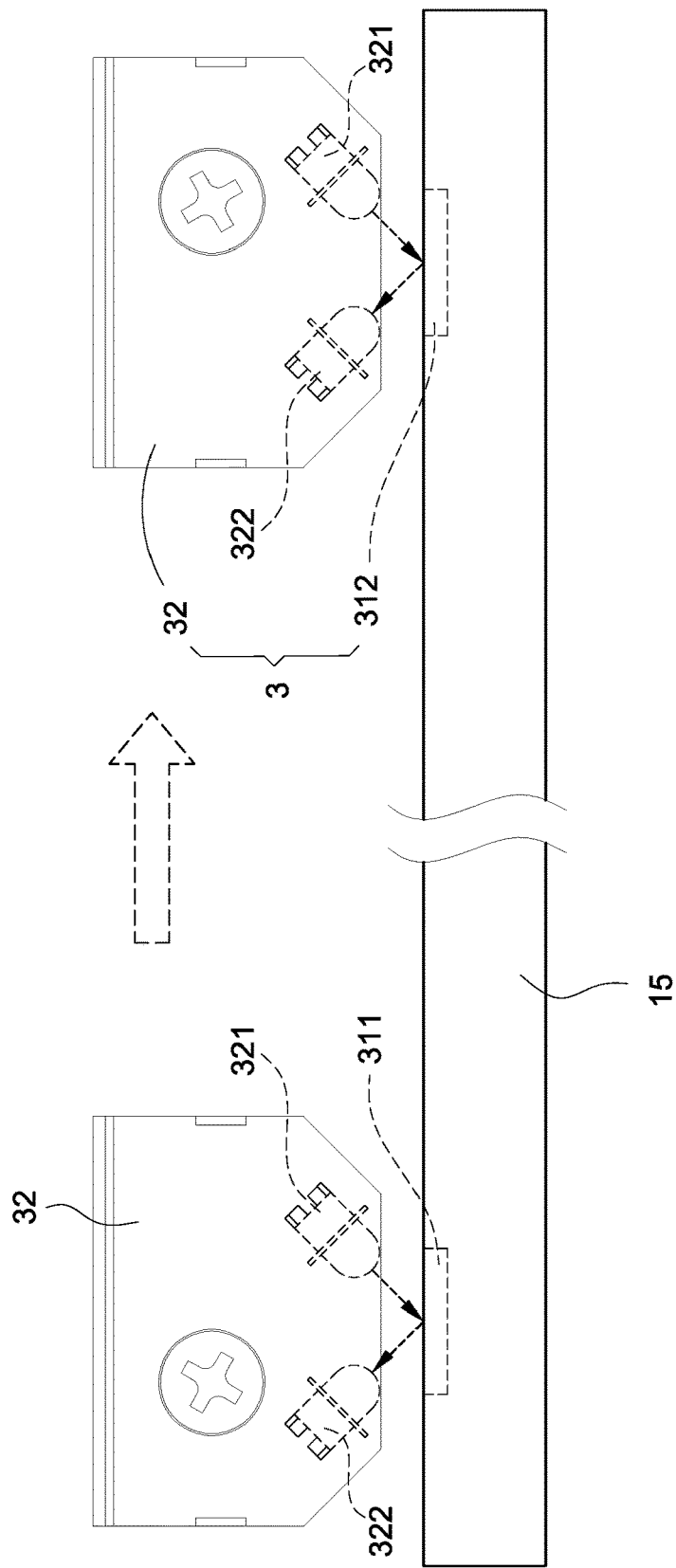
FIG. 6B is a reflected light quantity sensor operation schematic diagram of the first embodiment according to the present disclosure.
Figure 7:
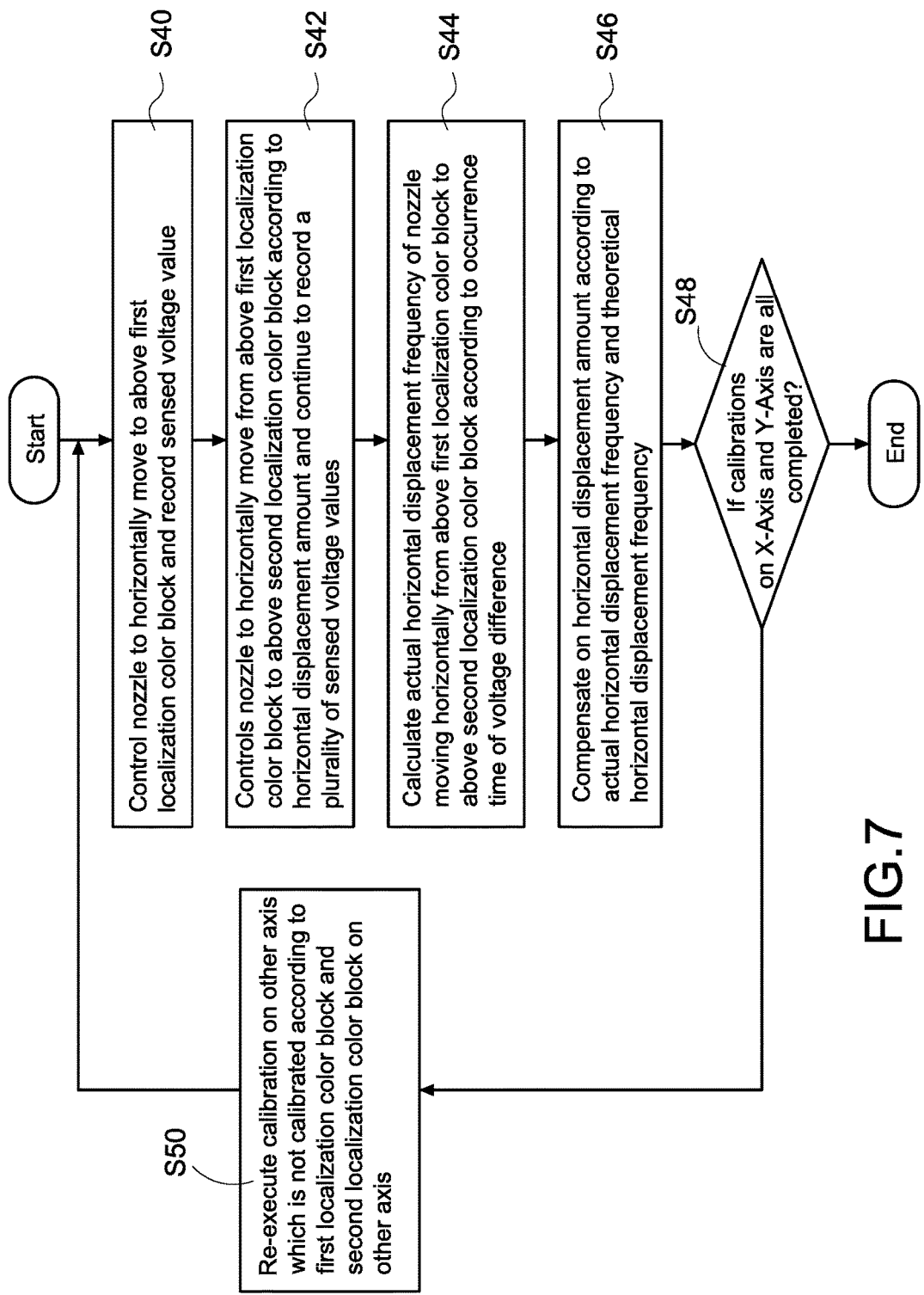
FIG. 7 is an X, Y-Axis calibration flowchart of the first embodiment according to the present disclosure.

Refer to FIG. 6A to FIG. 6C and FIG. 7, FIG. 6A is a horizontal calibration mechanism schematic diagram of the first embodiment according to the present disclosure, FIG. 6B is a reflected light quantity sensor operation schematic diagram of the first embodiment according to the present disclosure, FIG. 6C is a voltage variation schematic diagram of the first embodiment according to the present disclosure, and FIG. 7 is a X, Y-Axis calibration flowchart of the first embodiment according to the present disclosure;

As shown in FIG. 6A, a plurality of the localization color blocks 31 are disposed on the printing-platform 15. In the embodiment, the plurality of localization color blocks 31 at least comprise two first localization color blocks 311 and two second localization color blocks 312 respectively disposed along the X-Axis and the Y-Axis. More specifically, the two first localization color blocks 311 are respectively disposed at a left limit point of the X-Axis and the Y-Axis of the nozzle 14, and the two second localization color blocks 312 are respectively disposed at a right limit point of the X-Axis and the Y-Axis of the nozzle 14.

It should be noted that, in the other embodiment, the plurality of localization color blocks 31 further comprise a central localization color block 313 disposed on a center location of the printing-platform 15, and four angle localization color blocks 314 respectively disposed on four angle limit points of the printing-platform 15 of the nozzle 14. In the embodiment, the central localization color block 313 and the plurality of angle localization color blocks 314 are used for facilitating the 3D printer 1 to perform determination and calibration on tilt degree of the printing-platform 15 (detailed in the following).

As shown in FIGS. 6A and 6B, the reflected light quantity sensor 32 is disposed on the nozzle 14. More specifically, the reflected light quantity sensor 32 posed or locked to the casing of the nozzle 14. The reflected light quantity sensor 32 has a transmitting end 321 and a receiving end 322, which the transmitting end 321 and the receiving end 322 as well as one or multiple muzzles on the nozzle 14 (not shown in the diagrams) respectively face the same direction (particularly faces the top of the printing-platform 15).

The reflected light quantity sensor 32 externally emits light via the transmitting end 321. When the nozzle 14 is controlled to move to be above the printing-platform 15, the light shines on the printing-platform 15 or each localization color block 31 and the light reflects. The reflected light quantity sensor 32 receives the reflected light via the receiving end 322.

In the present disclosure, the color of the printing-platform 15 and each localization color block 31 is different. As a result, the receiving reflected light quantity of the receiving end 322 positioned above each localization color block 31 is different from the receiving reflected light quantity of the receiving end 322 positioned above other locations of the printing-platform 15. Therefore, the voltage values generated by the reflected light quantity sensor 32 are different according to receiving reflected light quantity. Thus, the 3D printer 1 is allowed to precisely determine if the nozzle 14 (i.e. the reflected light quantity sensor 32) currently is positioned above each localization color block 31.

In the embodiment, the color of the plurality of localization color blocks 31 is lighter than the color of the printing-platform 15, the voltage values sensed by the reflected light quantity sensor 32 positioned above the plurality of localization color blocks 31 are higher than the voltage values sensed above other locations of the printing-platform 15. In an embodiment, the voltage values sensed by the reflected light quantity sensor 32 positioned above the dispose location of the plurality of localization color blocks 31 are higher than 0.1V, the voltage values sensed by the reflected light quantity sensor 32 positioned above other locations of the printing-platform 15 are lower than 0.1V.

The above mentioned embodiments are preferred embodiments according to the present disclosure, the color of the plurality of localization color blocks 31 alternatively is darker than the color of the printing-platform 15, and the scope is not limited thereto. In other words, the only requirement is that the color of the plurality of localization color blocks 31 is different from the color of the printing-platform 15.

In the embodiment in FIG. 7, the procedures of the 3D printer 1 performing calibrations on the X-Axis and the Y-Axis via the horizontal calibration mechanism 3 is illustrated. Firstly, the 3D printer 1 controls the nozzle 14 to move horizontally to the above of either of the dispose locations for the two first localization color blocks 311, and records the voltage values sensed by the reflected light quantity sensor 32 (step S40). Next, the 3D printer 1 controls the nozzle 14 to horizontally move from the above of dispose location of the first localization color block 311 to the above of the dispose location of the second localization color block 312 on the same axis according to a horizontal displacement amount, and continues to record a plurality of voltage values sensed by the reflected light quantity sensor 32 during the movement (step S42).

It should be noted that, the horizontal displacement amount is the distance of the nozzle 14 moving once (or one unit) along the X-Axis or the Y-Axis upon the control by the 3D printer 1. In the embodiment, the 3D printer 1 is predetermined that the required movement frequency of the nozzle 14 moving from the above of the first localization color block 311 to the above of the second localization color block 312 on the same axis according to the horizontal displacement amount is a theoretical horizontal displacement frequency.

After the step S42, the 3D printer 1 calculates to generate an actual horizontal displacement frequency of the nozzle 14 moving horizontally from the above of the first localization color block 311 to the above of the second localization color block 312 on the same axis according to the occurrence time of a voltage difference among the plurality of voltage values sensed by the reflected light quantity sensor 32 (step S44). Next, the 3D printer 1 performs compensation on the horizontal displacement amount according to the actual horizontal displacement frequency and the theoretical horizontal displacement frequency (step S46). In the embodiment, the 3D printer 1 applies the compensated horizontal displacement amount to execute the above mentioned new printing tasks.

As shown in FIG. 6C, when the nozzle 14 is positioned above the first localization color block 311 or the second localization color block 312, the voltage value sensed by the reflected light quantity sensor 32 is higher (for example higher than 0.1V). When the nozzle 14 is positioned above other locations of the printing-platform 15, the voltage value sensed by the reflected light quantity sensor 32 is lower (for example lower than 0.1V). Accordingly, the 3D printer 1 determines if the nozzle 14 moves from the above of the first localization color block 311 to the above of the second localization color block 312 according to the above mentioned voltage difference.

For example, if the theoretical horizontal displacement frequency is 100 times, the nozzle 14 starts to move from the first localization color block 311 and moves 100 times (for example costs the time T1) according to the horizontal displacement amount (for example 0.2 cm), the nozzle accordingly should moves to a location above the second localization color block 312. However, if the nozzle 14 moves 100 times (i.e. after the time T1), and the above mentioned voltage difference has not occurred yet, then the horizontal displacement amount deviates. At this point, the 3D printer 1 controls the nozzle 14 to continue to move until the voltage difference occurs (for example costs the time T2). The 3D printer 1 applies the actual move frequency of the nozzle 14 as the actual horizontal displacement frequency (for example 101 times).

Identical with the above mentioned vertical displacement amount, when the horizontal displacement amount deviates, the 3D printer 1 performs compensation on the horizontal displacement amount according to the following Formula Two:

$$\text{The horizontal displacement amount} + \left( \frac{\text{actual horizontal displacement frequency} - \text{theoretical horizontal diplacement frequency}}{\text{theoretical horizontal displacement frequency}} \right) = \text{the horizontal displacement amount after compensation}$$ Formula Two With the above mentioned Formula Two, the 3D printer 1 is allowed to assure that the horizontal displacement amount applied each time executing printing tasks is the same, and when the 3D printer 1 controls the nozzle 14 to move horizontally according to the horizontal displacement amount, the actual horizontal displacement frequency equals to the predetermined theoretical horizontal displacement frequency.

After the step S46, the 3D printer 1 determines if the displacement calibrations on the X-Axis and the Y-Axis of the nozzle 14 are completed (step S48). When calibration on the X-Axis or the Y-Axis is not completed, the 3D printer 1 re-executes the above mentioned step S40 to the step S46 according to the other first localization color block 311 and the other second localization color block 312 on the other axis in order to perform displacement calibration on the axis which has not yet completed the calibration (step S50).

As mentioned above, the 3D printer 1 records a plurality of voltage values sensed from the above of each localization color block 31 by the reflected light quantity sensor 32 (for example including two first localization color blocks 311, two second localization color blocks 312, the central localization color block 313 and the four angle localization color blocks 314) when the 3D printer 1 performs the above mentioned displacement calibration on the X-Axis and the Y-Axis. In the present disclosure, the 3D printer 1 further performs a tilt degree calibration on the printing-platform 15 according to the plurality of voltage values.

Figure 8A:
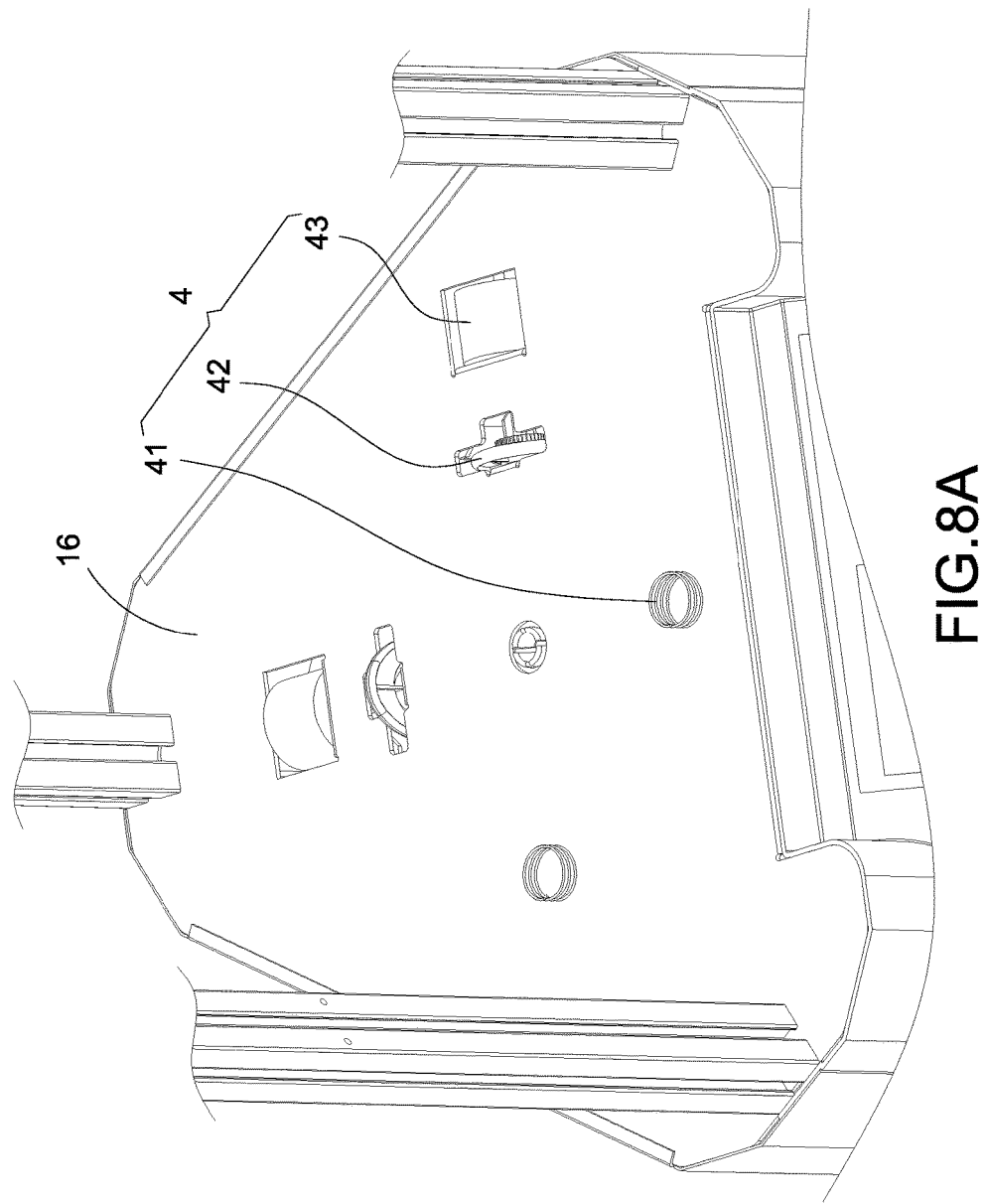
FIG. 8A is a printing-platform calibration mechanism schematic diagram of the first embodiment according to the present disclosure.
Figure 8B:
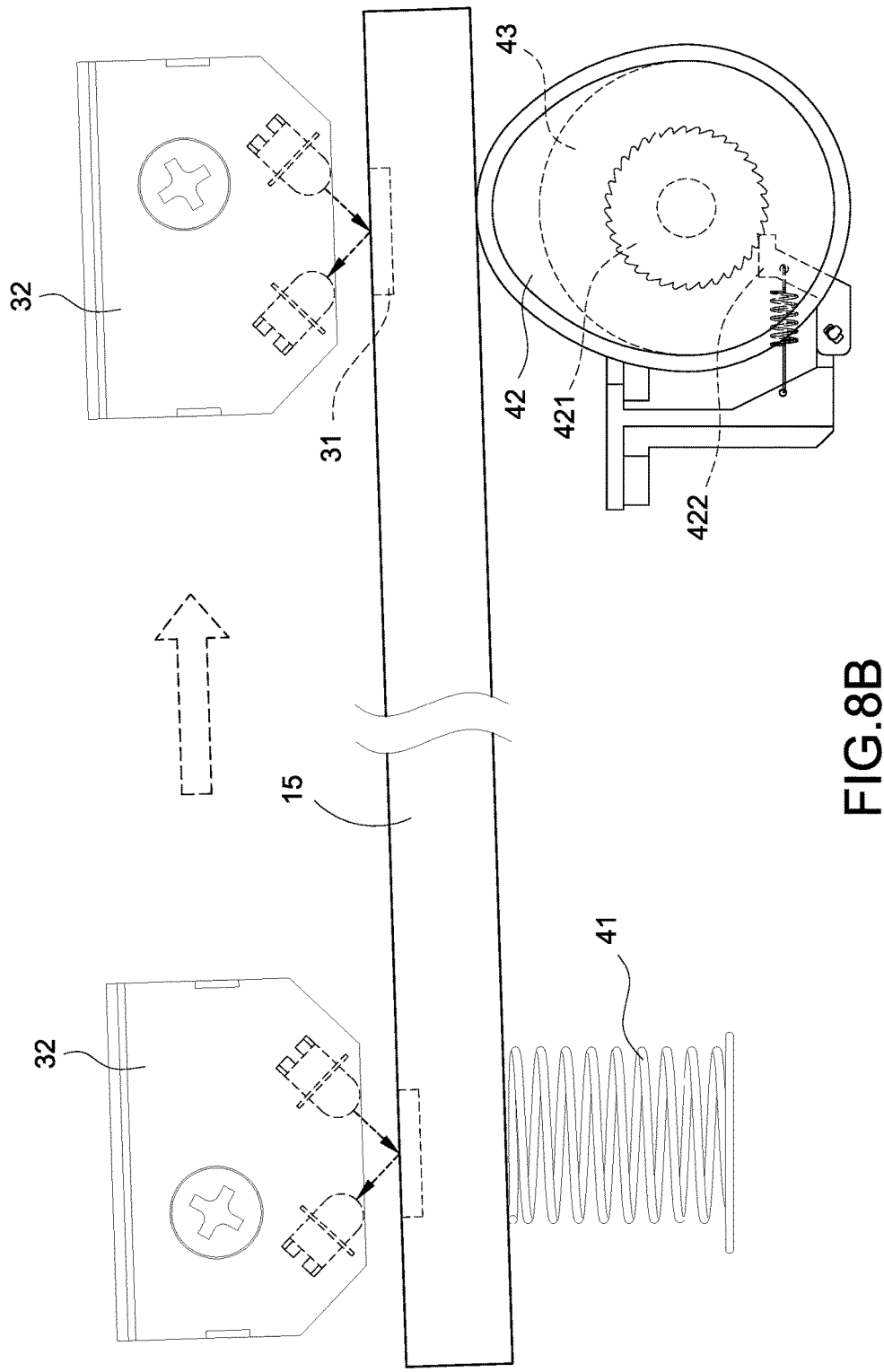
FIG. 8B is a printing-platform calibration mechanism schematic diagram of the second embodiment according to the present disclosure.
Figure 8C:
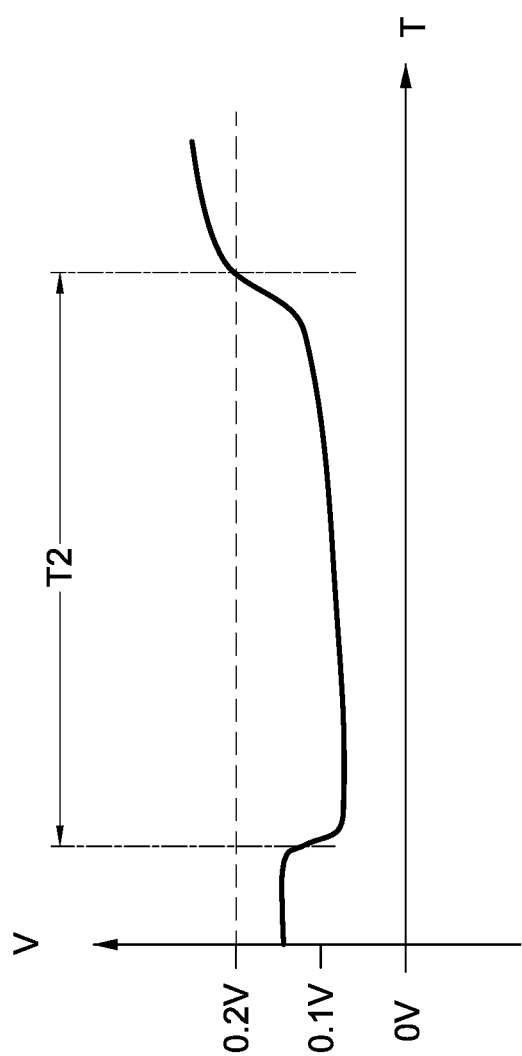
FIG. 8C is a voltage variation schematic diagram of the second embodiment according to the present disclosure.
Figure 9:
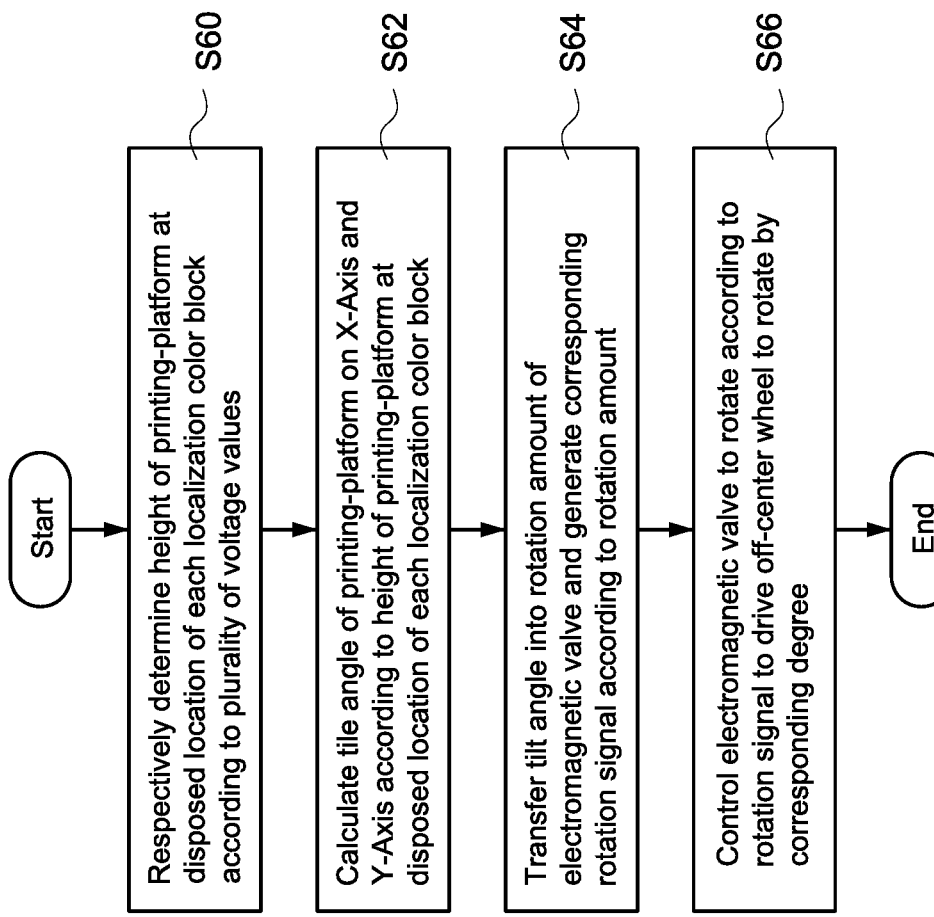
FIG. 9 is a printing-platform calibration flowchart of the first embodiment according to the present disclosure.

As shown in FIG. 8A, FIG. 8B, FIG. 8C and FIG. 9, FIG. 8A is a printing-platform calibration mechanism schematic diagram of the first embodiment according to the present disclosure, FIG. 8B is a printing-platform calibration mechanism schematic diagram of the second embodiment according to the present disclosure, FIG. 8C is a voltage variation schematic diagram of the second embodiment according to the present disclosure, and FIG. 9 is a printing-platform calibration flowchart of the first embodiment according to the present disclosure.

As shown in FIG. 8A, the elastic component 41 and the off-center wheel 42 of the printing-platform calibration mechanism 4 are disposed along the same axis. In the embodiment, two printing-platform calibration mechanisms 4 are disposed under the printing-platform 15 of the 3D printer 1, and two printing-platform calibration mechanisms 4 respectively disposed along the X-Axis and the Y-Axis, but the scope is not limited thereto. For illustration purpose, the embodiment below uses a single printing-platform calibration mechanism 4 (i.e. the 3D printer 1 only has a single elastic component 41, a single off-center wheel 42 and a single electromagnetic valve 43).

As shown in FIG. 8B, when the printing-platform 15 tilts, the distances between the reflected light quantity sensor 32 and each localization color block 31 are different. Thus, the voltage values sensed from the above of each localization color block 31 by the reflected light quantity sensor 32 are different. In the example shown in FIG. 8C, when the reflected light quantity sensor 32 is positioned above other locations of the printing-platform 15, the sensed voltage values are the lowest (for example lower than 0.1V). When the reflected light quantity sensor 32 is positioned above each localization color block 31 and the distance between the reflected light quantity sensor 32 and each localization color block 31 is higher or equals to a standard value, the sensed voltage values are the second highest (for example higher than 0.1V but lower than 0.2V). When the reflected light quantity sensor 32 is positioned above each localization color block 31 and the distance between the reflected light quantity sensor 32 and each localization color block 31 is smaller than the standard value, the sensed voltage values are the highest (for example higher than 0.2V).

As mentioned above, the 3D printer 1 determines the distance between the nozzle 14 and each localization color block 31 via a plurality of voltage values sensed by the reflected light quantity sensor 32. Therefore, when the distance between each localization color block 31 and the nozzle 14 are not equal, the 3D printer 1 calculates to generate a tilt angle between the printing-platform 15 and the nozzle 14 according to the plurality of voltage values.

The method according to the present disclosure uses the electromagnetic valve 43 and the off-center wheel 42 to adjust the tilt degree of the printing-platform 15. Specifically, when the printing-platform 15 is calibrated and the voltage values sensed above each localization color block 31 by the reflected light quantity sensor 32 are the same, the printing-platform 15 is horizontal and the distances between the nozzle 14 and the printing-platform 15 are all equals. Thus, the 3D models printed by the 3D printer 1 are not deformed or a printing failure is avoided.

In FIG. 9, the procedures of the 3D printer 1 performs the tilt degree calibration on the printing-platform 15 via the printing-platform calibration mechanism 4 is illustrated. Firstly, the 3D printer 1 respectively determines the height of the printing-platform 15 at the disposed location of each localization color block 31 according to a plurality of voltage values sensed above the plurality of localization color blocks 31 by the reflected light quantity sensor 32 (step S60). Next, the 3D printer 1 calculates to generate a tile angle of the printing-platform 15 on the X-Axis and the Y-Axis according to the height of the printing-platform 15 at the disposed location of each localization color block 31 (step S62).

After the calculation of the tilt angle is completed, the 3D printer 1 transfers the tilt angle into a rotation amount of the electromagnetic valve 43 via an algorithm or a table lookup operation, and generates a corresponding rotation signal according to the rotation amount (step S64). Lastly, the 3D printer 1 controls the electromagnetic valve 43 to rotate according to the rotation signal, and drives the off-center wheel 42 to rotate by a corresponding degree via the electromagnetic valve 43 (step S66).

In the embodiment, the elastic component 41 and the off-center wheel 42 are respectively disposed on two sides of the same axis (for example the above mentioned left limit point and the right limit point). Thus, the off-center wheel 42 rotates to enable a part of the printing-platform 15 near the location of the off-center wheel 42 to move upward or downward and also to enable other part of the printing-platform 15 near the location of the elastic component 41 to move downward or upward.

It should be noted that, as the embodiment shown in FIG. 8B, the off-center wheel 42 has a plurality of ratchets 421, and the printing-platform calibration mechanism 4 further comprises a clamp member 422. The clamp member 422 is used for locking the plurality of ratchets 421. With the plurality of ratchet 421 and the clamp member 422, the off-center wheel 42 only rotates in single direction. Thus, the issues where the printing-platform 15 is pressured by the nozzle 14 or printing materials (not shown in diagrams) causing the off-center wheel 42 to rotate in reverse direction are prevented. The reverse rotation will lead the printing-platform 15 tiles identical to the tilted status before calibration during the printing procedures.

The present disclosure is characterized in that, the 3D printer 1 performs displacement calibrations on the Z-Axis, the X-Axis and the Y-Axis, and a tilt degree calibration on the printing-platform 15 according to the vertical calibration mechanism 2, the horizontal calibration mechanism 3 and the printing-platform calibration mechanism 4 before executes new printing tasks, or after executes a certain number of printing tasks. Thus, the 3D printer 1 assures that each sliding components 12 and the nozzle 14 apply the same movement parameters in each printing task (for example the vertical displacement amount and the horizontal displacement amount) and further assures that the 3D model printed meet the quality requirements.

As the skilled person will appreciate, various changes and modifications can be made to the described embodiment. It is intended to include all such variations, modifications and equivalents which fall within the scope of the present invention, as defined in the accompanying claims.

What is claimed is:

1. A calibration method of a delta 3D printer, support brackets and support rods respectively disposed on three corners of the delta 3D printer, sliding components for moving vertically respectively disposed on each support rod, each sliding component respectively connected a nozzle via two arms for horizontally moving the nozzle, and the method comprises:
   a) performing a displacement calibration on a Z-Axis for each sliding component via a vertical calibration mechanism, wherein the vertical calibration mechanism comprises a plurality of light blocking sensors disposed on any support bracket and a shielding structure disposed on any sliding component;
   b) performing a displacement calibration on an X-Axis and a Y-Axis of the nozzle via a horizontal calibration mechanism, wherein the horizontal calibration mechanism comprises a reflected light quantity sensor disposed on the nozzle and a plurality of localization color blocks disposed on a printing-platform;
   c) performing an angle calibration on the printing-platform via a printing-platform calibration mechanism, wherein the printing-platform calibration mechanism comprises an elastic component and an off-center wheel disposed under the printing-platform and supporting the printing-platform, and an electromagnetic valve for controlling rotation of the off-center wheel; and
   d) executing a new printing task.

2. The calibration method of claim 1, wherein the plurality of light blocking sensors comprises a first light blocking sensor and a second light blocking sensor, and the step a comprises the following steps:
- a1) controlling the sliding component vertical to move to a first location which the shielding structure can block light emitting source of the first light blocking sensor;
- a2) controlling the sliding components to vertically move, according to a vertical displacement amount, from the first location to the second location which the shielding structure can block light emitting source of the second light blocking sensor;
- a3) calculating an actual vertical displacement frequency of the sliding components moving from the first location to the second location;
- a4) compensating on the vertical displacement amount according to the actual vertical displacement frequency and a theoretical vertical displacement frequency, wherein the sliding components execute new printing tasks according to the compensated vertical displacement amount.

3. The calibration method of claim 2, wherein the step a4 is compensating on the vertical displacement amount according to a formula:

the vertical displacement amount +

$$\left(\frac{\text{actual vertical displacement frequency} - \text{theoretical vertical diplacement frequency}}{\text{theoretical vertical displacement frequency}}\right) =$$

the compensated vertical displacement

4. The calibration method of claim 2, wherein the step a further comprises the following steps:
- a5) controlling the sliding components to vertically move to the first location from the second location according to the compensated vertical displacement amount, in order to validate if the actual vertical displacement frequency equals to the theoretical vertical displacement frequency upon controlling the sliding components to vertically move according to the compensated vertical displacement amount; and
- a6) controlling the sliding components to vertically move downward from the first location to enable the nozzle to move to a printing location of the printing-platform.

5. The calibration method of claim 2, wherein the plurality of localization color blocks at least comprise a first localization color block and a second localization color block disposed along the X-Axis or the Y-Axis, and the step b comprises the following steps:
- b1) controlling the nozzle horizontal to move to the above of the dispose location of the first localization color block, and recording voltage value sensed by the reflected light quantity sensor;
- b2) controlling the nozzle to horizontally move from the above of the dispose location of the first localization color block to the above of the dispose location of the second localization color block on the same axis according to a horizontal displacement amount, and continuing to record a plurality of voltage values sensed by the reflected light quantity sensor during the movement;
- b3) calculating an actual horizontal displacement frequency of the nozzle on the axis according to the occurrence time of a voltage difference of the recorded plurality of voltage values; and
- b4) compensating the horizontal displacement amount according to the actual horizontal displacement frequency and a theoretical horizontal displacement frequency, wherein the nozzle executes new printing tasks according to the compensated horizontal displacement amount.

6. The calibration method of claim 5, wherein the plurality of localization color blocks comprise two first localization color blocks respectively disposed along the X-Axis and the Y-Axis, and two second localization color blocks respectively disposed along the X-Axis and the Y-Axis, and the step b further comprises a step b5: re-executing the step b1 to the step b4 according to the first localization color block and the second localization color block on the other axis.

7. The calibration method of claim 5, wherein the step b4 is compensating on the horizontal displacement amount according to a formula:

the horizontal displacement amount +

$$\left(\frac{\text{actual horizontal displacement frequency} - \text{theoretical horizontal diplacement frequency}}{\text{theoretical horizontal displacement frequency}}\right) =$$

the compensated horizontal displacement amount.

8. The calibration method of claim 5, wherein the color of the plurality of localization color blocks is lighter than the color of the printing-platform, in the step b2, the reflected light quantity sensor respectively senses the reflected light quantity of the plurality of localization color blocks and the printing-platform during the movement and generates corresponding voltage values, wherein the voltage values sensed on dispose locations of the plurality of localization color blocks are higher than the voltage values sensed on the other locations of the printing-platform by the reflected light quantity sensor.

9. The calibration method of claim 5, wherein the elastic component and the off-center wheel are disposed along the same axis, and the step c comprises the following steps:
- c1) determining the height of the printing-platform at the disposed location of each localization color block according to a plurality of voltage values sensed by the reflected light quantity sensor on the dispose locations of the plurality of localization color blocks;
- c2) calculating a tilt angle of the printing-platform on the X-Axis and the Y-Axis according to the height of the printing-platform at the disposed location of each localization color block;
- c3) transferring the tilt angle to a rotation amount of the electromagnetic valve and generating a corresponding rotation signal; and
- c4) controlling the electromagnetic valve to rotate in order to drive the off-center wheel to rotate by a corresponding degree according to the rotation signal.

10. The calibration method of claim 9, wherein the plurality of localization color blocks further comprise a central localization color block disposed on a center location of the printing-platform.

11. The calibration method of claim 9, wherein the plurality of localization color blocks further comprise four angle localization color blocks respectively disposed on the four angle limit points of the printing-platform.

12. The calibration method of claim 9, wherein the quantity of the printing-platform calibration mechanisms is two respectively disposed along the X-Axis and the Y-Axis.

13. A delta 3D printer, comprising:
a base;
a printing-platform disposed on the base;
three support brackets vertically disposed on three corners of the base;
three support rods vertically disposed on three corners of the base;
three sliding components movably and respectively disposed on each support rod;
a nozzle respectively and pivotally connected to each sliding component via a plurality of arms;
a vertical calibration mechanism comprising a plurality of light blocking sensors disposed on one of the three support brackets and a shielding structure disposed on one of the three sliding components, and the vertical calibration mechanism being used for performing a displacement calibration on a Z-Axis for the three sliding components;
a horizontal calibration mechanism comprising a reflected light quantity sensor disposed on the nozzle and a plurality of localization color blocks disposed on the printing-platform, and the horizontal calibration mechanism being used for performing a displacement calibration on an X-Axis and a Y-Axis for the nozzle; and
a printing-platform calibration mechanism used for performing an angle calibration on the printing-platform, comprising an elastic component and an off-center wheel disposed under the printing-platform and supporting the printing-platform and an electromagnetic valve for controlling rotation of the off-center wheel.

14. The delta 3D printer of claim 13, wherein the plurality of light blocking sensors comprise a first light blocking sensor and a second light blocking sensor respectively disposed at a lower limit point and an upper limit point on one of the three support brackets, when the sliding component vertically moves to the lower limit point, the shielding structure blocks the light emitting source of the first light blocking sensor, when the sliding component vertically moves to the upper limit point, the shielding structure blocks the light emitting source of the second light blocking sensor.

15. The delta 3D printer of claim 14, wherein, wherein when an actual vertical displacement frequency required for the vertical movement of the sliding component to move between the first light blocking sensor and the second light blocking sensor according to the vertical displacement amount is different from a theoretical vertical displacement frequency, compensates on the vertical displacement amount according to a formula:

the vertical displacement amount +

$$\left( \frac{\text{actual vertical displacement frequency} - \text{theoretical vertical diplacement frequency}}{\text{theoretical vertical displacement frequency}} \right) =$$

a compensated vertical displacement amount.

16. The delta 3D printer of claim 13, wherein the color of the plurality of localization color blocks is lighter than the color of the printing-platform, and the plurality of localization color blocks at least comprise two first localization color blocks respectively disposed on a left limit point of the X-Axis and the Y-Axis of the nozzle and two second localization color blocks respectively disposed on right limit point of the X-Axis and the Y-Axis of the nozzle.

17. The delta 3D printer of claim 16, wherein, when the nozzle horizontally moves between the plurality of localization color blocks according to a horizontal displacement amount, the reflected light quantity sensor calculates an actual horizontal displacement frequency of the nozzle according to the occurrence time of a voltage difference of a plurality of voltage values sensed during the movement, and when the actual horizontal displacement frequency is different from a theoretical horizontal displacement frequency, compensates on the horizontal displacement amount according to a formula:

the horizontal displacement amount +

$$\left( \frac{\text{actual horizontal displacement frequency} - \text{theoretical horizontal diplacement frequency}}{\text{theoretical horizontal displacement frequency}} \right) =$$

a compensated horizontal displacement amount.

18. The delta 3D printer of claim 13, wherein the elastic component and the off-center wheel are disposed along the same axis, the reflected light quantity sensor respectively senses corresponding voltages on dispose locations of each localization color block, calculates a tilt angle of the printing-platform on the axis according to each voltage value, generates a corresponding rotation signal according to the tilt angle, and controls the electromagnetic valve to rotate in order to drive the off-center wheel to rotate by a corresponding degree according to the rotation signal.

19. The delta 3D printer of claim 18, wherein the off-center wheel has a plurality of ratchets, and the printing-platform calibration mechanism further comprises a clamp member, the clamp member locks with the plurality of ratchets for restricting the off-center wheel from rotating in single direction.

20. The delta 3D printer of claim 18, wherein the quantity of the printing-platform calibration mechanisms are two, and respectively disposed along the X-Axis and the Y-Axis, and the plurality of localization color blocks further comprise a central localization color block disposed on a center location of the printing-platform and four angle localization color blocks respectively disposed on the four angle limit points of the printing-platform.

* * * * *